W. HOSKINS.
MANUFACTURE OF KEENE'S CEMENT.
APPLICATION FILED MAY 13, 1918.
1,370,968. Patented Mar. 8, 1921.
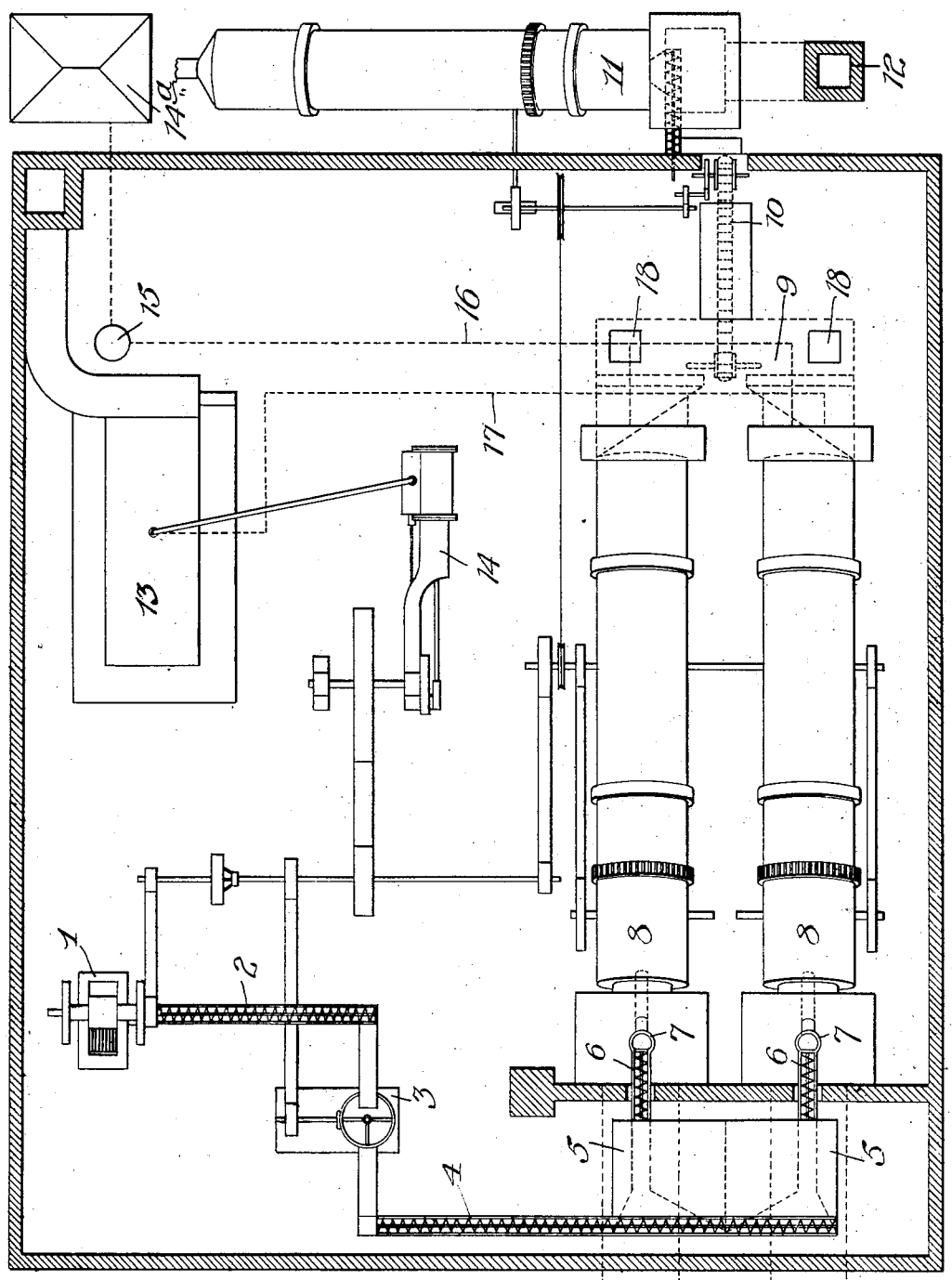

UNITED STATES PATENT OFFICE.

WILLIAM HOSKINS, OF CHICAGO, ILLINOIS, ASSIGNOR TO THE BEST BROTHERS KEENE'S CEMENT COMPANY, OF MEDICINE LODGE, KANSAS, A CORPORATION OF KANSAS.

MANUFACTURE OF KEENE'S CEMENT.

1,370,968.  Specification of Letters Patent.  Patented Mar. 8, 1921.

Application filed May 13, 1918. Serial No. 234,256.

*To all whom it may concern:*

Be it known that I, WILLIAM HOSKINS, a citizen of the United States, residing at Chicago, in the county of Cook and State of Illinois, have invented a new and useful Improvement in the Manufacture of Keene's Cement, of which the following is a specification.

My invention relates to the art of manufacturing Keene's cement, and will be fully understood from the following specification, taken in connection with the accompanying drawing, which represents diagrammatically a type of plant suitable for the manufacture of Keene's cement in accordance with my process. The plant illustrated by the drawing receives the gypsum in the form in which the latter is quarried, that is, in lumps of a weight up to perhaps 100 pounds, crushes and grinds the gypsum, burns the latter to effect the predetermined dehydration, and cools the burnt product. The subsequent stages of manufacture, *i. e.*, the final grinding and admixture with the set accelerator or catalyst, is accomplished by the known types of machinery not illustrated.

The quarried gypsum enters the plant at the jaw-crusher designated 1 in the drawing, in which it is preliminarily crushed, then delivered by the conveyer 2 to a rotary mill 3, in which it is ground to a relatively fine state of subdivision, for example, until 60% of it will pass a 60 mesh screen, the remainder being not larger than ¼ mesh.

From the mill 3 the ground gypsum is delivered by an elevating conveyer 4 to a pair of gravity feed-hoppers 5. From the bottoms of the hoppers 5 the ground gypsum is fed by regulating conveyers 6 to feed-spouts 7, through which it discharges by gravity into the upper ends of the two rotary kilns 8, these kilns being of the usual form heretofore commonly employed in the Portland cement industries. The kilns 8 are internally fired, as by oil burners, at their lower ends, this construction being well understood and not illustrated. At the nose-rings of the kilns the product spills into the chamber 9, from which it is continuously removed by the chain-conveyer 10, and thence delivered to a third rotary cooling kiln 11, preferably mounted outside the building which houses the remainder of the plant, as is illustrated in the drawing. The cooling kiln 11 is likewise of the ordinary kiln construction, the hot material being received in the inlet end thereof and passing slowly through the same to the outlet end, being subjected throughout its course to a natural draft of air entering at the outlet end of the kiln and escaping through a stack 12 connected with the chamber at the inlet end of the kiln. The steam-boiler 13 supplying an engine 14 provides power by which the plant machinery is operated through the connections shown. The fuel-supply tank 14 is illustrated as located outside of the building, supplying fuel to a pump 15 which provides the pressure for feeding the same to the burners, the oil and steam delivery lines being designated 16, 17, respectively. Air is delivered to the burners through the air flues 18 and the combustion gases are led from the inlet ends of the kilns to the stacks 19 in the usual way. In the plant diagrammatically illustrated by the drawing the kilns 8 are each 60 feet in length, 5 feet in internal diameter, are driven at a speed of .75 revolution per minute (45 revolutions per hour) and pitched at ⅜ inch to one foot, this construction and method of operation giving a time interval of 55 minutes in which any given batch of gypsum passes through the kiln.

The apparatus described above is operated in the following manner: The quarried gypsum, preliminarily crushed in the jaw-crusher 1, and subsequently reduced to the indicated state of fineness in the mill 3, is delivered to the hoppers 5 from which it feeds, by gravity, to the regulating conveyers 6. The drive of these conveyers is so adjusted as to deliver the finely divided gypsum to the kilns at a predetermined and uniform rate. I have found it to be particularly necessary to carefully control this feeding operation, since if the feed is seriously slackened or interrupted for any considerable period of time, I find that the temperatures within the kilns rapidly rise, overburning the product and rendering it useless. It should therefore be noted as particularly important that the feed to the kilns must be uniformly maintained at the predetermined rate, this rate being fixed by the size, rate of firing, and speed of the kiln, as will later appear.

The continuous stream of gypsum in the state of subdivision described, enters the upper ends of the kilns 8, building up and maintaining a bed of gypsum on the bottom of each kiln, the material in the bed moving continuously downward toward the lower end of the kiln until it finally spills over the nose rings. In its passage through the kiln, the bed of relatively finely divided gypsum continuously exposes fresh surfaces to the wall of the kiln and to the atmosphere of highly heated combustion gases therein. I have found that with the material in the state of subdivision mentioned the degree of dehydration required for the production of a Keene cement stock of standard grade is effected by firing the kiln in such manner as to maintain a temperature of from 850 to 1500° F., this being the temperature of the gypsum bed itself at the nose-rings of the kiln, where the time of passage of the material through the kiln ranges from one-half to two hours, the shorter time of passing requiring the higher temperature, and, conversely, the longer time of passing permitting the lower temperature. In the installation illustrated by the drawing, I find that the best results for the production of the standard grade of Keene cement are attained by maintaining an average temperature of approximately 1100°, the time of passage through the kiln being 55 minutes, and the rate of feed for each kiln 2¼ to 2½ tons per hour. If the feed be increased substantially, other conditions remaining the same, it will be found that the temperature of the gypsum bed will drop, giving an underburnt product, while, conversely, if the feed is reduced or interrupted the product is overburnt.

The continuous stream of burnt gypsum spilling over the nose-rings of the two kilns 8, being at that time at a temperature of approximately 1100°, is conveyed to the rotary cooling kiln 11 by the mechanism described, and in traversing the latter becomes reduced to a moderate temperature so that it may be handled without special precautions. It may be noted with respect to the cooler 11 that it is desirable to check or baffle the air current therein in order that the dust loss may not be excessive, the continued agitation of the product in the burning kiln and in the cooling kiln reducing a large portion of it to a degree of fineness which necessitates guarding against dust losses. The cooled product delivered from the lower end of the cooler 11 is conveyed in any appropriate manner to a mill, in which it is reduced to the desired degree of fineness for the market, and simultaneously or subsequently admixed with the proper proportion of potash-alum, or other setting agent, all in the usual manner, except in so far as the precautions to be hereinafter mentioned are to be observed.

I have discovered that the operation of calcining gypsum to the extent required for the production of Keene cement, as carried out by direct firing in a rotary kiln produces a product which has pecularities distinguishing it most markedly from the burnt gypsum heretofore used for the manufacture of Keene cement and produced entirely, so far as I am aware, by prolonged firing in stationary kilns and while in the form of relatively large aggregates.

The distinguishing pecularity of the product produced in accordance with my method is the change in the character of the lime content by the rotary kiln calcining operation. Whereas a certain quality of gypsum burned in the customary manner in stationary kilns, later ground, mixed with potash-alum, and set, produced a highly satisfactory cement of good tensile strength, density and appearance, this same quality of gypsum when burned with the utmost care by my rotary kiln method, and apparently dehydrated to an identical chemical condition, being admixed with the same setting agent and set in the same manner, gave a final product which had swelled very greatly in the mold, was deficient in tensile strength and density and markedly porous. These same results varying only in degree may be expected with any natural gypsum now known to be available in the United States. This puffiness, porosity, or swelling of the cement produced by direct firing at high temperatures for a relatively short interval of time of finely divided gypsum, in accordance with my process, I find to be due not to the gypsum itself, but to the change in character of the calcium carbonate content thereof brought about by the method of manufacture described. I find that this difficulty may be entirely corrected by three methods, as follows:

1. By the addition to the burnt product of a quantity of hydrate of lime, for example, 0.2 to 0.5%, although any proportion greater than this may be used.

2. By the use of a setting agent more strongly acid than the potash-alum which is commonly employed, for example, by the use of potash sulfate, containing .25 free acid.

3. By grinding the burnt product to an unusually fine state of subdivision, for example, 150 mesh.

Based upon the foregoing, it is my conclusion that in the calcining of the gypsum in the manner described, the lime content thereof suffers a peculiar modification, which I assume to be surface calcination, perhaps accompanied by surface sintering, fluxing, or fusing, these results being explainable by reason of the very high flame temperature in the kiln and the opportunity which is necessarily given for overburning of the surfaces of the particles. It is my belief that by reason of this surface modification of the lime content of the burnt product, the acid constituent of the setting agent, as for example, potash-alum, re-acts with the calcium compounds much more slowly than would normally be the case, so that the reaction is still incomplete and carbon-dioxid is still being liberated when the material has set so far as to prevent its escape. By virtue of this continuing reaction during the period of setting, the cement is therefore caused to puff and become porous. As before stated, this difficulty may be entirely overcome by speeding up the reaction of the acid constituent of the setting agent with the lime content of the cement, which acceleration may be accomplished in any one of the three ways mentioned. The action being properly accelerated, the evolution of carbon dioxid ceases while the cement remains so nearly fluid as to permit the free escape of the liberated gas.

By the process described I am therefore able to produce from gypsum a dehydrated product suitable for use in the production of Keene's cement by a rotary kiln calcining method, which is highly desirable from an economic standpoint and superior to the stationary kiln method heretofore required. While by the practice of my process certain difficultly explainable variations in product as compared with the product made by the process heretofore employed, resulted, which variations would appear *prima facie* to negative the utility of my process, I have found that the difficulties met with are not due to any basic or irremediable fault in the process of the product, but are, on the other hand, caused by a trifling change in the character of an impurity, the results of which may be entirely offset by the corrective measures indicated.

In view of the past and existing state of relative stagnation of the art of producing Keene's cement, and the prevailing opinion of those best skilled in the art, based upon costly and unsuccessful efforts, that it would be impossible to produce a satisfactory product without adhering substantially to the known methods, I have in the foregoing set forth in considerable detail the exact procedure and apparatus which I employ in the practice of my invention, together with the results of variations from this procedure and the theories which I entertain with respect to the peculiarities of my process. It will be understood, however, that all of this matter is only for the purpose of making my invention more readily understood, and I do not regard the invention as limited to the exact procedure or apparatus described, nor as dependent upon the soundness or accuracy of these theories, except in so far as such limitations are included within the terms of the accompanying claims, in which it is my intention to claim all novelty inherent in my invention as broadly as is permissible in view of the prior art.

What I claim is:

1. The method of producing Keene's cement stock which consists in reducing gypsum to a state of subdivision such that the largest particles shall not substantially exceed one-quarter mesh, continuously introducing the product at a uniform rate into a rotary kiln, operating the kiln to cause the gypsum to progress through the same in a period of not less than one-half hour and firing the kiln internally to maintain a temperature of not more than 1500° F. and not less than 800° F. in the outgoing burnt gypsum, the higher temperature being employed in conjunction with the shorter time of burning.

2. The method of producing Keene's cement stock which consists in reducing gypsum to a state of subdivision such that the largest particles shall not substantially exceed one-quarter inch mesh, continuously introducing the finely divided product at a uniform rate into a rotary kiln, operating the kiln to cause the gypsum to progress through the same in a period of substantially one hour, and firing the kiln internally to obtain a temperature of approximately 1100° F. in the outgoing burnt gypsum.

3. The method of producing Keene's cement stock which consists in reducing gypsum to a relatively fine state of subdivision, continuously passing the finely divided product at a uniform rate through a rotary internally-fired kiln, and treating the burnt product to insure completion of the carbon-dioxid liberating reaction before loss of fluidity of the setting cement.

4. The method of producing Keene's cement stock which consists in reducing gypsum to a relatively fine state of subdivision, passing the subdivided product continuously at a uniform rate through a rotary internally-fired kiln, and adding hydrate of lime to the burnt product in amount sufficient to neutralize all acidity.

5. The method of producing Keene's cement stock which consists in reducing gypsum to a relatively fine state of subdivision continuously passing the finely divided product at a uniform rate through a rotary internally-fired kiln, and adding an acid substance to the burnt product in amount sufficient to insure completion of the carbon dioxid liberating reaction before loss of fluidity of the setting cement.

6. The method of producing Keene's cement stock which consists in reducing gypsum to a relatively fine state of subdivision, continuously passing the finely divided product at a uniform rate through a rotary internally-fired kiln, and grinding the burnt product to at least 150 mesh.

WILLIAM HOSKINS.